United States Patent [19]

Nishikawa et al.

[11] Patent Number: 5,107,754
[45] Date of Patent: Apr. 28, 1992

[54] ARTICULATED MECHANISM WITH ROTARY VANE MOTORS

[75] Inventors: Masao Nishikawa, Tokyo; Masaru Ozawa; Masato Hirose, both of Saitama, all of Japan

[73] Assignee: Honda Giken Kogyo Kabushiki Kaisha, Tokyo, Japan

[21] Appl. No.: 291,795

[22] Filed: Dec. 29, 1988

[30] Foreign Application Priority Data

Dec. 30, 1987 [JP] Japan .................. 62-332722
Dec. 30, 1987 [JP] Japan .................. 62-332723
Dec. 30, 1987 [JP] Japan .................. 62-332724

[51] Int. Cl.$^5$ .................. F15B 11/00; F01C 9/00; F16D 31/02
[52] U.S. Cl. .................. 91/530; 60/484; 60/493; 92/122
[58] Field of Search .................. 901/14, 15, 20, 22; 91/525, 530; 60/484, 493; 92/120, 122, 121

[56] References Cited

U.S. PATENT DOCUMENTS

| | | | |
|---|---|---|---|
| 1,876,104 | 9/1932 | Tucker | 92/122 |
| 3,155,013 | 11/1964 | Rumsey | 92/120 |
| 3,411,413 | 11/1968 | MacNeill et al. | 91/357 |
| 3,513,752 | 5/1970 | Perry et al. | 91/357 |
| 3,696,713 | 10/1972 | Ragard | 91/357 |
| 4,510,850 | 4/1985 | Mack | 92/125 |
| 4,561,816 | 12/1985 | Dingess | 414/4 |
| 4,751,868 | 6/1988 | Paynter | 901/28 |
| 4,767,257 | 8/1988 | Kato | 901/15 X |
| 4,842,474 | 6/1989 | Torii et al. | 901/15 |

FOREIGN PATENT DOCUMENTS

| | | |
|---|---|---|
| 1191154 | 4/1960 | Fed. Rep. of Germany. |
| 3535885 | 5/1986 | Fed. Rep. of Germany. |
| 2054157 | 4/1971 | France. |
| 2521056 | 8/1983 | France. |
| 2132274 | 7/1984 | United Kingdom. |

Primary Examiner—Edward K. Look
Assistant Examiner—John Ryznic
Attorney, Agent, or Firm—Lyon & Lyon

[57] ABSTRACT

An articulated mechanism for use as an articulated arm of an industrial robot, for example, includes a plurality of arms interconnecting articulations having respective fluid pressure angular displacement motors for angularly displacing the arms relatively to each other. A plurality of pipes are positioned in the arms, respectively, for supplying a fluid under pressure to the articulations, and a plurality of oil passages are disposed in the articulations, respectively, and branched from the pipes, respectively, to supply the fluid under pressure to the fluid pressure motors.

11 Claims, 6 Drawing Sheets fig. 1.

ARTICULATED MECHANISM WITH ROTARY VANE MOTORS

BACKGROUND OF THE INVENTION

1. Field of the Invention

The present invention relates to an articulated mechanism, and more particularly to a piping mechanism in an articulated mechanism such as an industrial robot or the like.

2. Description of the Prior Art

Hydraulically actuated articulated devices such as industrial robots or power shovels have hydraulically operated motors associated with respective articulations. For sending oil under pressure to and returning oil from each of the motors, it is necessary to employ two higher- and lower-pressure oil pipes. Since links interconnected by the articulations are movable relatively to each other, the pipes are usually in the form of flexible rubber hoses as disclosed in Japanese Laid-Open Pat. Publication No. 57- 48039, for example.

The flexible hoses are however expensive and require large joints on their opposite ends. A working space has to be provided around the links and articulations for assembling and maintaining the flexible hoses. Therefore, it is impossible to provide a compact arrangement around the motors in designing the articulated mechanisms. Moreover, the flexible hoses cannot neatly be arranged because of their nature, and always look disorderly as compared with rigid pipes of steel or the like. One mechanism which does not require any flexible hose is a swivel joint comprising a rotary body and rotatable oil seals juxtaposed axially on the surface of the rotary body, the oil seals defining spaces therebetween for use as a passage for a fluid under pressure. This mechanism permits oil under pressure to be transmitted through an articulation without employing any flexible hose.

One type of hydraulically actuated motor is an angular displacement motor or rotary actuator which is repeatedly angularly movable within a limited angular range. The angular displacement motor finds frequent use in various applications because it is of a simple construction and needs simpler inner seals than those used in a motor which produces continuously endless rotary motion. Japanese Laid-Open Pat. Publication No. 55 51107 shows an example of such an angular displacement motor.

Hydraulic motors including angular displacement motors are generally small in size and capable of producing a high power output. Therefore, the pressure of a working fluid supplied to the hydraulic motor is selected to be as high as possible. However, the high fluid pressure applied to the motor exerts large forces to various parts of the motor, tending to deform these parts to the extent that smooth motor operation may no longer be available or tending to deform seals so that oil leakage is increased and hence the efficiency of the motor is lowered. One solution is to increase the rigidity of the parts of the motor, and hence the conventional motors and other hydraulic devices have been made of iron-base materials having high Young's moduli and had increased wall thicknesses. The motors and hydraulic devices thus constructed then make an entire hydraulic system heavy and have a large energy requirement. Another solution is to rely on the principles of a pressure balancing mechanism for applying a suitable counter pressure to the parts, which may be of reduced wall thickness, of a hydraulic motor to which the hydraulic pressure of working oil is usually applied. A variety of pressure balancing mechanisms have been proposed primarily in the field of hydraulic pumps.

A hydraulic motor is in principle the reverse of a hydraulic pump. It may be possible to employ a pressure balancing mechanism in a hydraulic motor for producing balancing forces. However, opposite pressures may not be balanced in an angular displacement motor because the angular displacement motor produces reciprocating angular motion. Typically, pressures acting on the opposite sides of a side plate of the angular displacement motor cannot be balanced well. More specifically, the side plate is apt to be pushed and expanded outwardly by oil pressure imposed on one side of the side plate from the working chamber in the motor. The oil pressure from the working chamber is not constant, but increases with the stroke of the motor. If the counterbalancing pressure applied to the other side of the side plate were set to a constant level, then the side plate would be excessively pushed back or not sufficiently pushed back as the motor stroke varies. If the counterbalancing pressure were relatively large, the side plate would be deformed when the working oil pressure from the working chamber is low. To avoid such side plate deformation, the thickness of the side plate must be increased. The working oil pressure applied from the working chamber to tend to deform the side plate varies with the motor stroke since an area for bearing the working oil pressure varies with the motor stroke. No appropriate counterbalancing pressure can be generated by providing a fixed area for bearing the counterbalancing pressure. Consequently, there has been a limitation on efforts to make the angular displacement motors lightweight.

The output torque of a hydraulically actuated angular displacement motor is greater as the radius of an angularly movable piston is larger. Stated otherwise, a region of the piston which is closer to the central axis thereof is less conducive to the generation of the output torque, and hence such a region is not an effective space for producing the output torque. Where a directional control valve for controlling the angular displacement motor is incorporated in the motor, the control valve is usually positioned at the central axis of the piston. If the axis of angular movement of an angular displacement motor is positioned substantially horizontally, then it is desirable that oil and air in the cylinder of the motor be well separated and air be discharged as rapidly as possible for the purpose of maintaining the response of a hydraulic system in which the motor is employed at a high level. To meet such a demand, a supply port for supplying oil under pressure to the cylinder should be positioned as high as possible. Heretofore, oil under pressure is supplied from the directional control valve at the central axis of the piston through a casing of the motor to a supply port which opens at the highest position on the cylinder. With such an arrangement, however, the oil passage extending from the directional control valve to the cylinder is long, making it impossible to make the response of the hydraulic system high. Moreover, the long oil passage requires a large space and designing the long oil passage is time-consuming and costly.

SUMMARY OF THE INVENTION

It is an object of the present invention to provide an articulated mechanism which employs swivel joints, rather than flexible hoses, for supplying a high-pressure fluid to and receiving a returning fluid from respective articulations, the articulated mechanism being compact, inexpensive, assemblable and maintainable within a limited space, and sightly in appearance.

Another object of the present invention is to provide an articulated mechanism having angular displacement motors in respective articulations, each motor having a side plate balancing mechanism for counterbalancing fluid pressures acting on a side plate to minimize any deformation of the side plate, so that the motors may be made small in size and lightweight without increasing the rigidity of the side plate undesirably.

Still another object of the present invention is to provide an articulated mechanism having angular displacement motors in respective articulations, each motor having a fluid supply passage defined directly in a piston thereof for supplying a fluid under pressure, so that the motors may be made simple in construction and can reliably discharge air mixed in the fluid.

According to the present invention, there is provided an articulated mechanism comprising a plurality of articulations, a plurality of arms interconnecting the articulations, a plurality of fluid pressure motors disposed in the articulations, respectively, for displacing the arms relatively to each other, a plurality of pipes positioned within the arms, respectively, for supplying a fluid under pressure to the articulations, and a plurality of oil passages disposed in the articulations, respectively, and branched from the pipes, respectively, to supply the fluid under pressure to the fluid pressure motors.

Since the pipes for supplying the fluid under pressure are disposed in the arms and the oil passages for supplying the fluid from the pipes to the fluid pressure motors are included in the articulations, no flexible hoses are required any longer, and hence the articulated mechanism is compact in size, can be designed with greater freedom, can be assembled and maintained within a smaller space, and is signtly in appearance.

Each of the fluid pressure motors comprises an angular displacement motor for angularly displacing the arms relatively to each other, the angular displacement motor comprising a cylinder, a piston angularly movably disposed in the cylinder, and a fluid pressure directional control valve disposed in the piston axially centrally with respect to the cylinder. The piston has oil passages extending radially between an outer circumferential surface thereof and the fluid pressure directional control valve for supplying the fluid to a working chamber defined in the cylinder on one side of the piston and for discharging the fluid from another working chamber defined in the cylinder on the other side of the piston.

The directional control valve and ports defined in the piston for supplying the fluid into and discharging the fluid from the working chambers are directly interconnected by the oil passages in the piston. Therefore, the motor is simple in construction. The oil passages defined in the piston have openings at the outer circumferential surface of the piston, these openings or ports are located at a high position for effectively discharging air mixed with the fluid introduced into the cylinder or working chamber.

The angular displacement motor further includes a side plate held sideways against the cylinder and piston, the working chambers being defined jointly by the side plate, the cylinder, and the piston. The side plate has a plurality of pressure chambers defined in a side thereof which is opposite to the working chambers, and means for introducing a fluid pressure from the working chambers successively into the pressure chambers in response to angular movement of the piston in the cylinder.

With the side plate thus constructed, the side plate may be of reduced rigidity and may be made of a material of a smaller specific gravity (i.e., a smaller Young's modulus) such as aluminum. The motor with the side plate made of such a material is small in size, lightweight, and highly durable.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
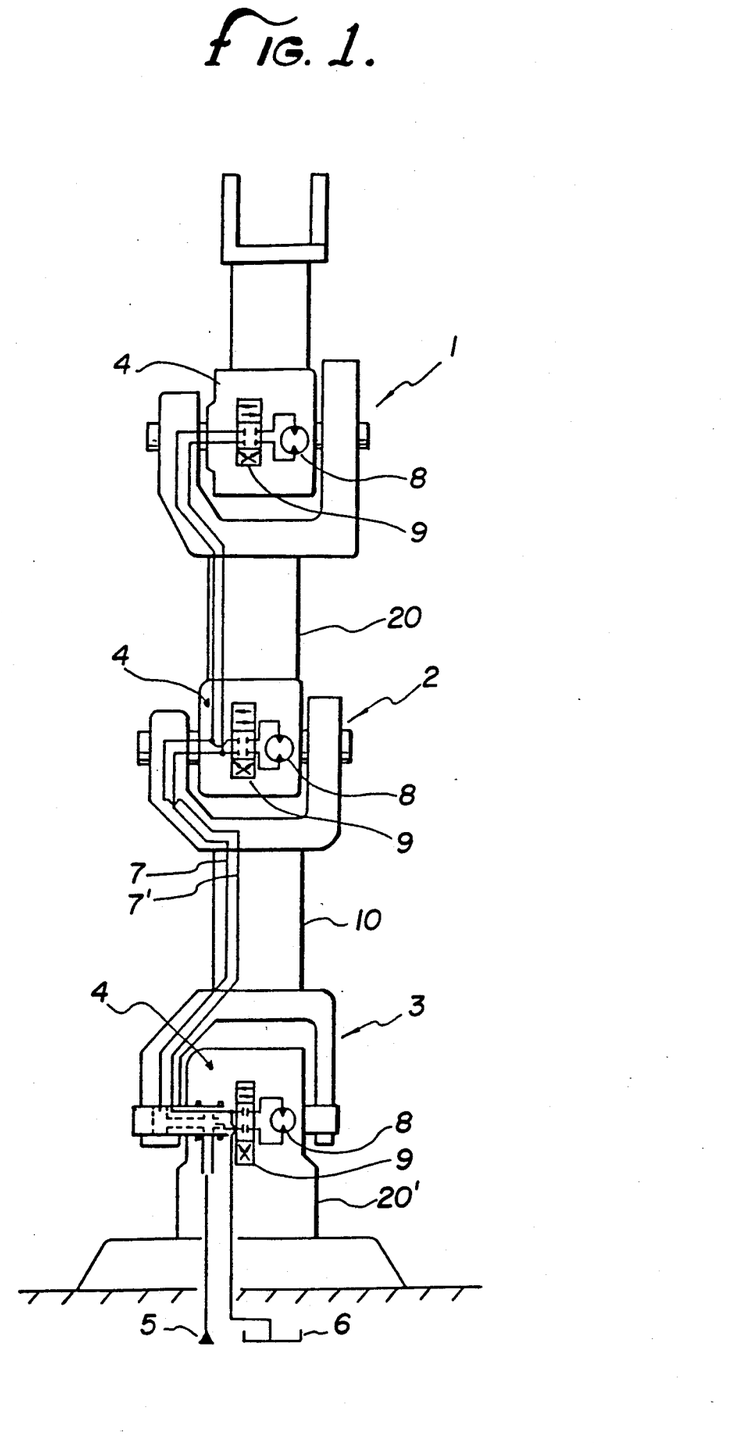
FIG. 1 is a schematic view of an articulated mechanism according to the present invention.

FIG. 1 shows an articulated mechanism such as a working robot in accordance with the present invention.

The articulated mechanism is mounted on a base, e.g., supported on a floor or suspended from a ceiling of a factory. The articulated mechanism comprises three arms or links 20, 10, 20' operatively interconnected by two articulations 2, 3. An end effector such as a hand is mounted on the distal end of the articulated mechanism by an articulation 1. Each of the articulations 1, 2, 3 has a swivel joint 4. Oil circulated under pressure between an oil pressure source 5 and a tank 6 is transmitted through pipes 7, 7' extending through the articulations and the arms. The pipe 7 supplies the oil under pressure to the successive articulations 3, 2, 1, and also to motors 8 disposed in the respective articulations 3, 2, 1 through directional control valves 9 for actuating the motors 8.

Each of the motors 8 is in the form of an angular displacement motor or rotary actuator, and will be described in detail below.

Figure 2:
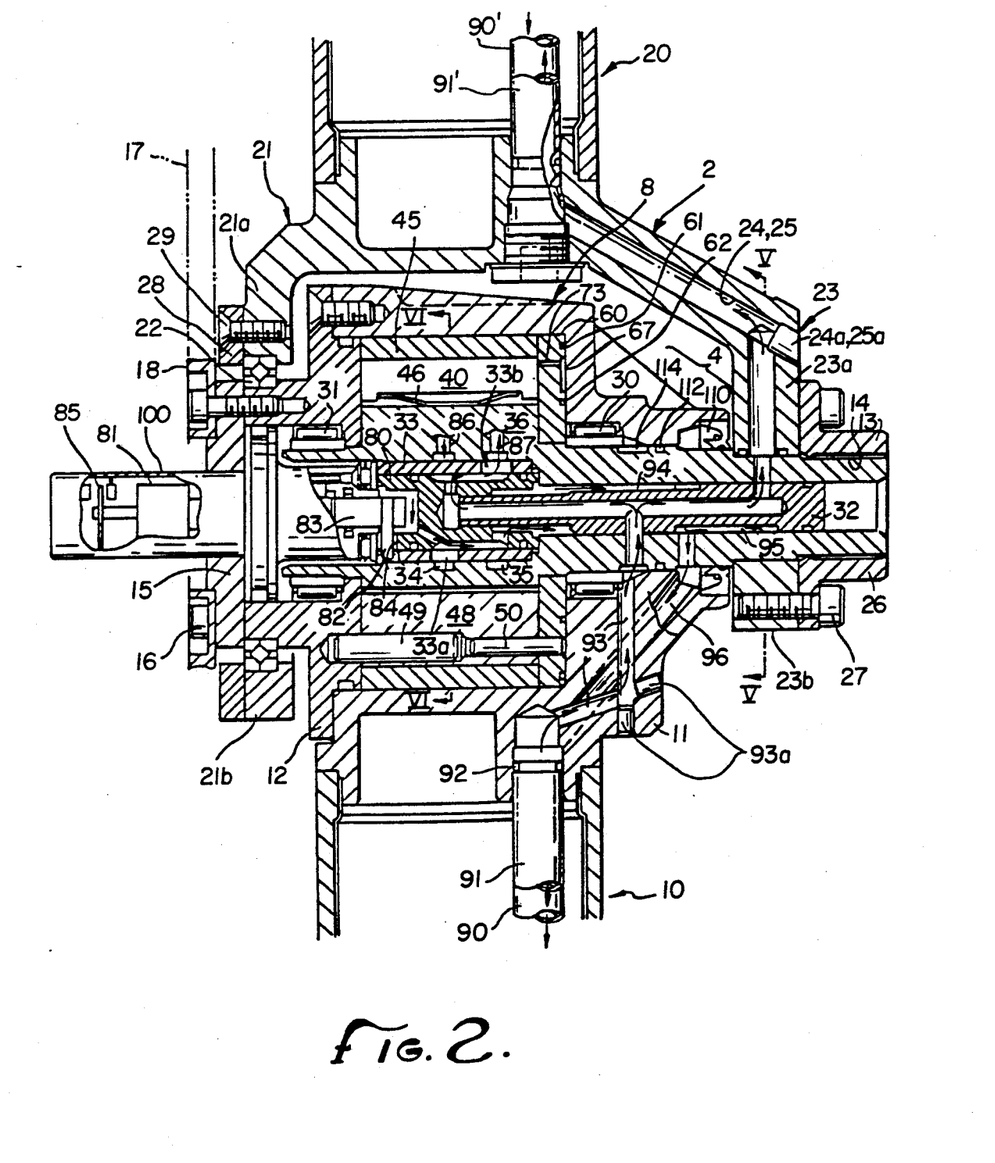
FIG. 2 is a cross-sectional view of an articulation of the articulated mechanism.

FIG. 2 illustrates the motor 8 which is accommodated in the articulation 2 between the arms 10, 20. The arm 10 has an upper end connected to a casing 11 in which the motor 8 is disposed. More specifically, the motor 8 is housed in the casing 11 and a cover 12 fastened to the casing 11, the motor 8 having a hollow output shaft 13 rotatably supported in the casing 11 and the cover 12. The output shaft 13 has splines 14 on the righthand end (as shown) though which the output torque of the motor 8 can be transmitted to the arm 20.

Figure 3:
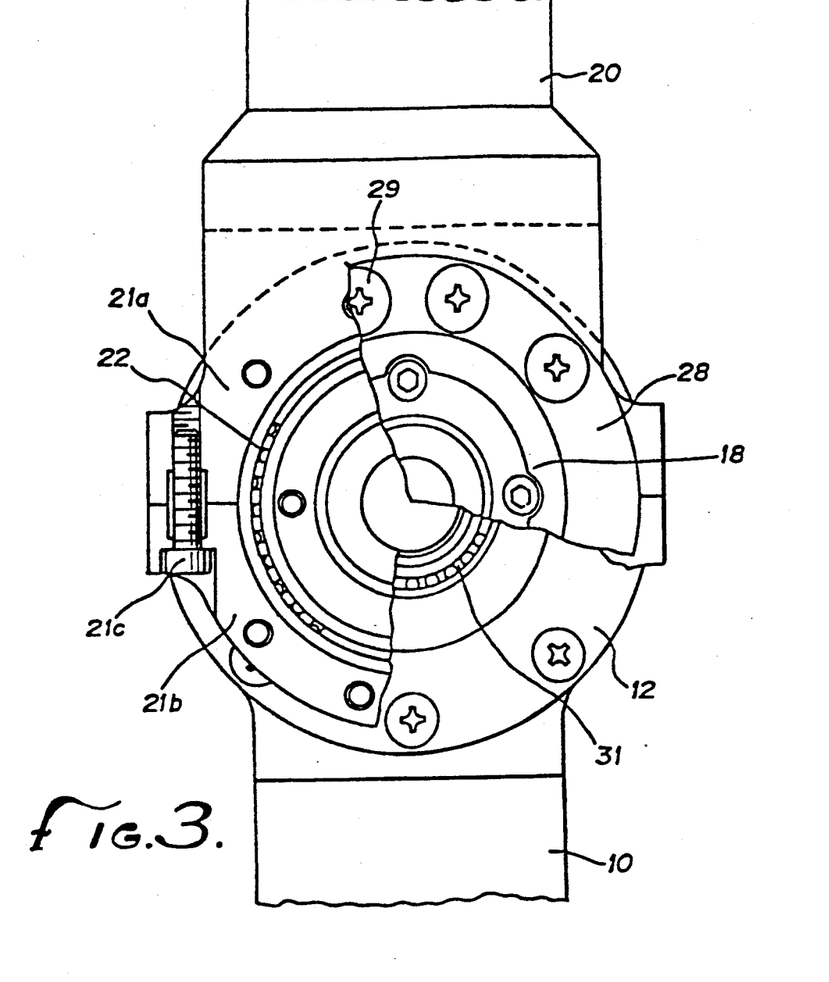
FIG. 3 is a lefthand side elevational view, partly broken away, of the articulation shown in FIG. 2.
Figure 4:
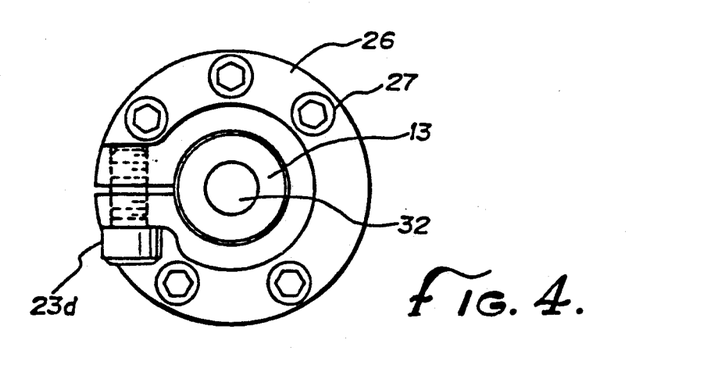
FIG. 4 is a righthand side elevational view of the articulation of FIG. 2.
Figure 5:
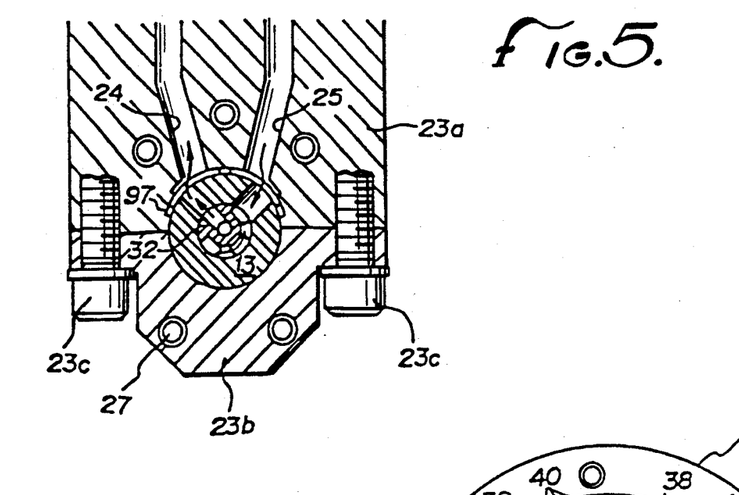
FIG. 5 is a cross-sectional view taken along line V—V of FIG. 2.

The arm 20 has a yoke on the lower end thereof, the yoke including a lefthand yoke member 21 rotatably coupled to the cover 12 and a righthand yoke member 23 having oil passages 24, 25 defined therein. The yoke member 23 is coupled to the output shaft 13 in surrounding relation thereto by a joint 26. The joint 26 is held in mesh with the splines 14 and fixed to the yoke member 23 by means of a plurality of bolts 27 for transmitting the output torque of the motor 8 to the yoke member 23. As shown in FIGS. 3 and 5, the yoke member 21 comprises a yoke body 21a and a cap 21b which are fastened to each other by means of bolts 21c, and the yoke member 23 comprises a yoke body 23a and a cap 23b which are fastened to each other by means of bolts 23c. As shown in FIG. 4, the joint 26 is of a split annular shape and is tightened by a bolt 23d after the splines 14 will have been fitted in the joint 26, so that the splines 14 will not wobble in the joint 26. A washer 28 is attached to the yoke member 21 by countersunk screws 29 to retain a first bearing 22 by which the cover 12 is rotatably supported in the yoke member 21.

Referring back to FIG. 2, a motor flange 15 is fixed to the cover 12 by bolts 16 to confine the bearing 22 against axial movement. The motor flange 15 is integrally formed with a casing 100 of a control DC motor (described later). A potentiometer (not shown) for detecting the angular displacement of the motor 8 is mounted on the arm 20 at a suitable position thereon. A belt pulley 18 is attached to the motor flange 15 and a timing belt 17 is trained around the belt pulley 18 for transmitting the angular displacement of the motor 8 to the potentiometer.

The output shaft 13 of the motor 8 is rotatably supported by a second bearing 30 disposed in the casing 11 and a third bearing 31 disposed in the cover 12. A central shaft 32 defining oil passages is press-fitted in a righthand portion (as viewed in FIG. 2) of the output shaft 13, and a sleeve 33 serving as a rotary valve is also press-fitted in a lefthand portion of the output shaft 13. The output shaft 13 has two annular grooves 34, 35 surrounding the sleeve 33.

Figure 6:
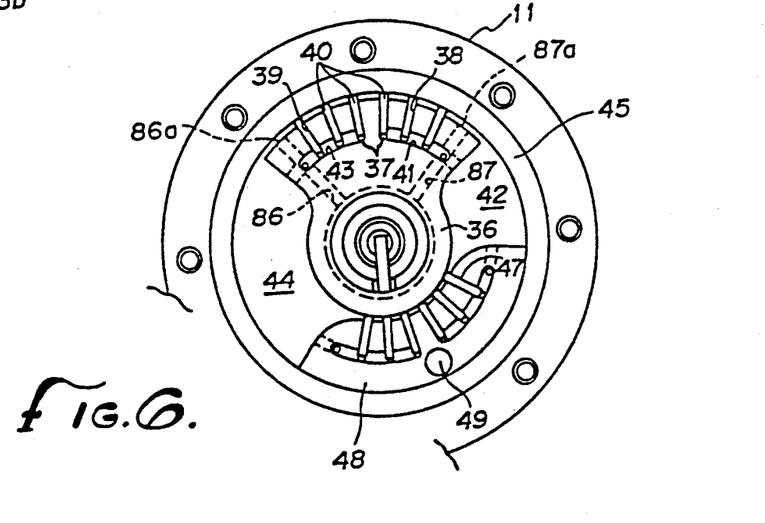
FIG. 6 is a cross-sectional view taken along line VI—VI of FIG. 2.

The output shaft 13 includes a rotary piston 36 of a relatively large diameter which is axially positioned between the second and third bearings 30, 31. A side plate 60 disposed in the casing 11 and the cover 12 are on opposite axial sides of [axially sandwiches] the piston 36. A hollow cylinder 45 is disposed in the casing 11 between the side plate 60 and the cover 12 and houses the rotary piston 36. As shown in FIG. 6, the rotary piston 36 includes an upper sector-shaped portion and has small holes 37 defined therein parallel to the output shaft 13 and two groups of grooves 38, 39, three in each group, defined therein and extending radially outwardly, the grooves 38, 39 having a constant width. First vanes 40 are slidably inserted in the respective grooves 38, 39. The grooves 38 are held in hydraulic communication with a working chamber 42 defined in the cylinder 45 by the piston 36 through an oil passage or groove 41 defined in one side of the piston 36. The grooves 39 are held in hydraulic communication with another working chamber 44 defined in the cylinder 45 by the piston 36 through an oil passage or groove 43 defined in the side of the piston 36. The vanes 40 are urged outwardly under an oil pressure developed in the small holes 37, while at the same time urged inwardly under an oil pressure acting on the radially outer edges thereof. The combined forces acting on the vanes 40 however tend to push the vanes 40 slightly outwardly, but the vanes 40 are retained in the illustrated position (FIG. 6) by the cylinder 45. In order to retain the vanes 40 properly in the illustrated position even before such oil pressures are generated, leaf springs 46 (FIG. 2) are disposed in the respective grooves 38, 39 for initially biasing the vanes 40. The cylinder 45 has an axial length slightly larger than the axial length of the piston 36, and the vanes 40 are substantially as long as the piston 36 in the axial direction. In FIG. 6, a stator 48 is disposed in a lower position in the cylinder 45 and has a plurality of second vanes 47 slidably held therein, the stator 48 having the same axial length as that of the cylinder 45. The second vanes 47 are exactly identical in construction and function to the first vanes 40 in the piston 36. Oil pressures from the working chambers 42, 44 are introduced into grooves defined in the stator 48 and housing the vanes 47, and leaf springs (not shown) are disposed in those grooves for biasing the vanes 47. The stator 48 and the cylinder 45 are separately fabricated, and then bonded together by an adhesive applied to their mating surfaces, after which they are simultaneously machined to the same length. A first pin 49 extends axially from the cover 12 into a hole in the stator 48 for preventing the stator 48 from rotating in the cylinder 45 under reactive forces from the piston 36 when the motor 8 is operated. A second pin 50 of a relatively small diameter is also inserted axially in the stator 48 and the side plate 60 to prevent the side plate 60 from being dragged around upon angular displacement of the motor 8.

Figure 7:
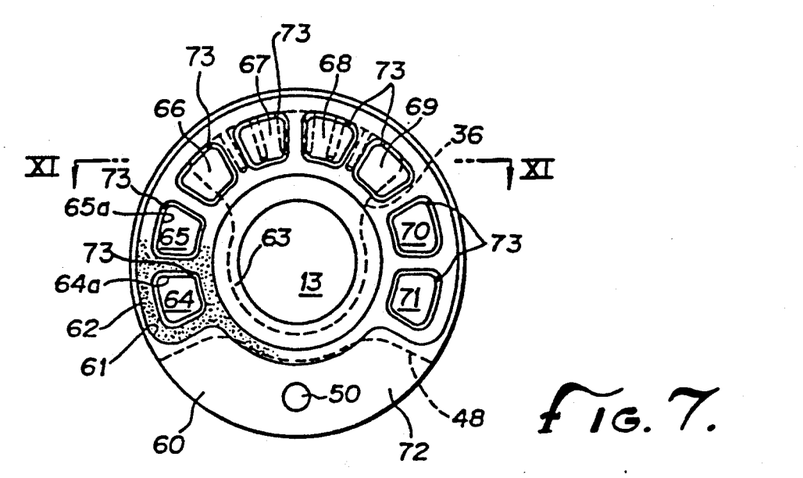
FIG. 7 is a view showing the reverse side of a side plate.

The side plate 60 incorporates a pressure counterbalancing mechanism as described below. As illustrated in FIGS. 2 and 7, the side plate 60 has a groove or recess 61 of a constant depth defined in the surface thereof which faces away from the working chambers 42, 44, and a seal member 62 of rubber is fitted in the groove 61. As better shown in FIG. 7, the seal member 62 is of a unitary structure having a substantially semicircular shape, and has eight windows defined in a peripheral portion thereof, and a central annular hole, with a lower portion recessed to provide a non-sealing region. The central annular hole, the windows, and the recessed lower portion define a plurality of pressure chambers 63, 64, 65, 66, 67, 68, 69, 70, 71, 72. These pressure chambers are hydraulically isolated from each other after the motor 8 has been assembled. The central chamber 63 is concentric with the output shaft 13 and is supplied with oil pressure directly from the oil pressure source, as described later on. The eight pressure chambers 64 through 71 are of the same configuration, and are angularly equidistantly spaced in the circumferential direction and equally spaced from the output shaft 13. The pressure chambers 64 through 71 communicate with small holes 73 defined in the side plate 60 and extending axially between its opposite surfaces. The holes 73 are positioned in upper portions of the working chambers 42, 44, i.e., in vertically upper positions when the motor 8 is assembled in the arms 10, 20, and serve to remove air from oil flowing therethrough, as described later. The small holes 73 have a diameter smaller than the thickness of the vanes 40 in the piston 36. In order that the chambers 64 through 71 will function reliably as pressure chambers, shallow recesses 64a through 71a each having a depth of about 1 mm are defined around the chambers 64 through 71, respectively. With the motor 8 being assembled, the non-sealing region 72 is positioned behind the stator 48.

In FIG. 2, an oil pressure directional control valve 80 is rotatably disposed in the sleeve 33 (FIG. 8) and cooperates therewith in providing a rotary valve. More specifically, the directional control valve 80 is responsive to relative angular displacement with respect to the sleeve 33 for connecting one of the working chambers 42, 44 to the oil pressure source 5 and the other working chamber to the tank 6 for controlling operation of the motor 8. The directional control valve 80 comprises a four-way directional control valve, which will not be described in detail as it has no direct bearing on the present invention. A control DC motor 81 for applying a controlling angular displacement to the directional control valve 80 is disposed in the casing 100 integral with the motor flange 15. The DC motor 81 has an output shaft 83 from which a pin 82 projects radially outwardly into a slot 84 defined in the directional control valve 80 (see FIG. 8). A rotary encoder 85 is disposed adjacent to the DC motor 81 for detecting the angular displacement thereof. The DC motor 81 may be combined with a speed reducer (not shown) if required.

Figure 8:
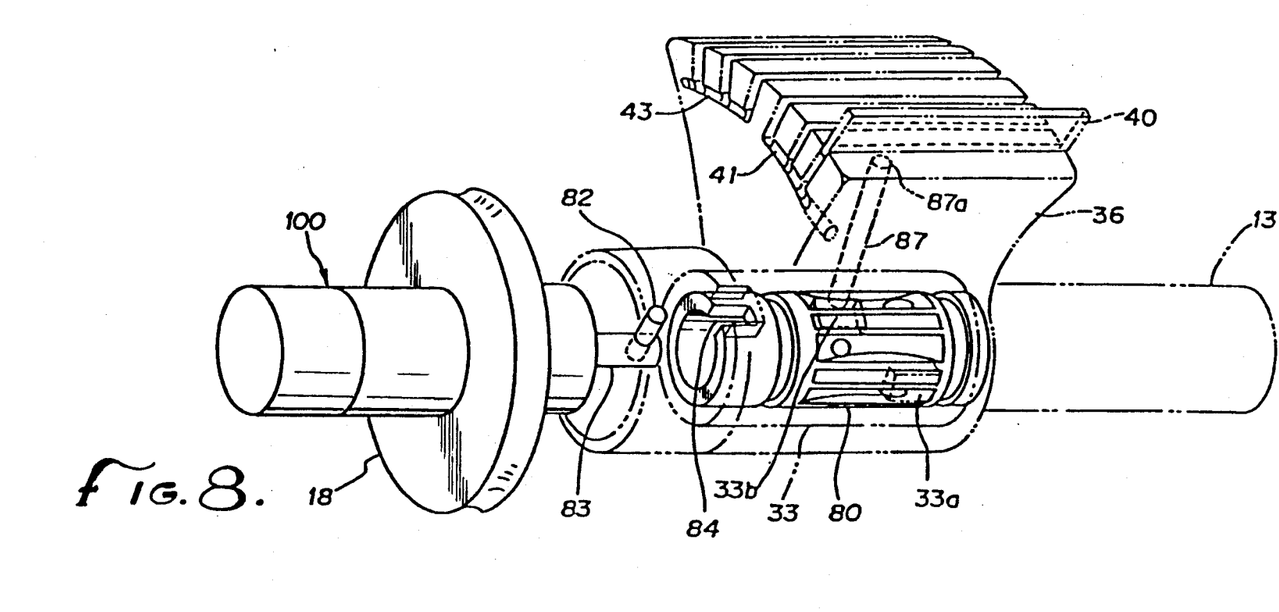
FIG. 8 is a schematic perspective view of a sleeve and an oil pressure directional control valve which are inserted in the output shaft of an angular displacement motor.

Output oil pressure discharged from the directional control valve 80 flows out of an opening 33a or 33b defined in the sleeve 33, dependent on the angular position of the valve 80, and then flows through one of two oil passages 86, 87 defined radially in the piston 36 and the corresponding one of their end openings 86a, 87a into the working chamber 44 or 42 (In FIG. 2, the sleeve opening 33b and the oil passage 87 are on a higher-pressure side). The oil passages 86, 87 are defined radially in the piston 36 by means of a drill, and hence can easily be formed. Since the oil passages 86, 87 are defined along straight lines between the directional control valve 80 and radially outer positions on the piston 36, as shown in FIG. 8 (only the oil passage 87 is shown), the response of the motor 8 is increased. As shown in FIG. 6, the openings 86a, 87a of the oil passages 86, 87 are positioned close to the outermost vanes 40 and adjacent to these outermost vanes 40 to minimize the amount of air remaining in oil as it returns to the tank 6.

Figure 9:
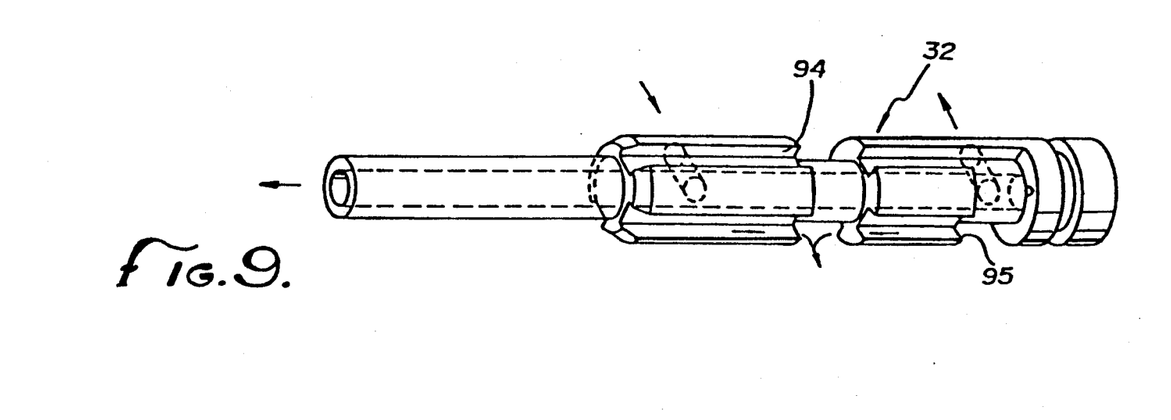
FIG. 9 is a perspective view of a central shaft.

As described above, two oil passages (indicated by 7, 7' in FIG. 1) are disposed in the arms 10, 20 for supplying oil under pressure from the oil pressure source 5 to the working chambers 42, 44 through the directional control valve 80 in each articulation and returning oil under pressure from each of the motors 8 to the tank 6. More specifically, two pipes 90, 91 (corresponding to the oil passages 7, 7', respectively) are disposed in the arm 10 with sealing O-rings 92 on their opposite ends. The pipe 91 is connected to the oil pressure source 5 and the pipe 90 is connected to the tank 6. As indicated by the arrows in FIG. 2, oil supplied under pressure from the oil pressure source 5 via the pipe 91 flows through a first hole 93 defined in the casing 11 into a central passage defined in the central shaft 32 from which the oil is supplied to a higher-pressure port of the directional control valve 80 (In FIG. 2, the higher-pressure port is shown as being connected to the oil passage 87 and a lower-pressure port is shown as being connected to the oil passage 86). As also indicated by the arrows, returning oil flows from the directional control valve 80 via an oil passage 94 (see also FIG. 9) around the central shaft 32 in an annular groove 95 from which the oil is delivered via a second hole 96 defined in the casing 11 into the pipe 90. The swivel joint 4 which comprises seals 110, 112, 114 is disposed around the output shaft 13 for allowing oil to be supplied and returned through the articulation 2, as described above. As shown in FIG. 5, the oil from the central passage in the central shaft 32 flows through the oil passage 24 in the yoke member 23a to the next articulation 1. Oil returned from the articulation 1 flows through the oil passage 25 in the yoke member 23a into the annular groove 95 (see also FIG. 9), from which the oil returns through the oil passage 96 in the casing 11 and the oil passage 90 back to the tank 6. As illustrated in FIG. 5, a seal member 97 is disposed on the output shaft 13 to prevent the oil flowing into the oil passage 24 from leaking into the oil passage 25 and hence the groove 95. As shown in FIG. 2, two pipes 90', 91' are disposed in the arm 20 and connected to the oil passages 25, 26, respectively, for returning and supplying the oil under pressure. The pipes 90', 91' have lower ends held in the yoke 23 and held in the illustrated position under upward forces applied by blind screws or springs. The oil passages 93, 24, 25 have open ends closed off by plugs 93a, 24a, 25a. The articulated mechanism thus constructed may be employed as an articulated arm for an industrial robot, a power shovel or other construction machines, or the like.

The articulated mechanism will operate as follows:

In response to a control command from a control unit (not shown), the DC motor 81 turns the output shaft 83 about its own axis to angularly displace the directional control valve 80 to connect one of the working chambers 42, 44 to the oil pressure source 5 and the other working chamber to the tank 6, as described above. As a result, a pressure difference is developed across the piston 36 between the working chambers 42, 44 to turn the motor 8 hydraulically, thus turning the piston 36 and hence the output shaft 13 in one direction. The rotative power of the output shaft 13 is applied through the splines 14 to generate a moment between the arms 10, 20, which are therefore angularly moved relatively to each other about the motor 8.

The oil pressure in the working chambers 42, 44 acts axially in the cylinder 45. The magnitude of such axial oil pressure is equal to the product of the internal pressure in the working chambers and the effective area which bears the applied internal pressure. More specifically, assuming that the piston 36 (shown by the broken line in FIG. 7) first reaches a maximum stroke in the counterclockwise direction and then is angularly driven in the clockwise direction, the lefthand working chamber (as shown in FIG. 7) serves as a chamber supplied with oil pressure from the oil pressure source 5 and the righthand working chamber serves as a chamber discharging oil pressure to the tank 6. The area of the lefthand chamber is very small, and the pressure-bearing area thereof is also small, but it progressively increases with the stroke of the piston 36 and becomes maximum when the piston 36 reaches the maximum stroke in the clockwise direction. This holds true when the piston 36 is angularly driven in the opposite direction, except that the righthand chamber is then supplied with oil pressure from the oil pressure source 5 and the lefthand chamber discharges oil pressure to the tank 6.

The pressure chambers 64 through 71 defined in the surface of the side plate 60 remote from the piston 36 are held in communication with the working chambers 42, 44 through the holes 73. As the piston 36 is progressively turned, the vanes 40 move successively past the holes 73, introducing the oil pressure from the working chambers 42, 44 successively into the pressure chambers 64 through 71 through the holes 73. Therefore, a counterbalancing oil pressure is developed in the pressure chambers 64 through 71. The effective pressure-bearing area to which such a counterbalancing balancing oil pressure is applied on the pressure chamber side of the side plate 60 is increased as the stroke of the piston 36 is increased, for thereby minimizing forces applied to the side plate 60 which tend to deform the side plate 60.

In each of the articulations, the output shaft 13 is combined with the swivel joint 4, and supplied oil under pressure is divided within the output shaft 13 into one flow supplied to actuate the motor 8 in the articulation and one flow directed toward the next articulation. Thus, the oil supply system in the articulation is compact. The pipes 91, 90, 91', 90' for sending the oil under pressure to and returning the oil under pressure from the articulations are disposed in the arms, making the articulated mechanism look sightly and slender in appearance. These concealed pipes also make the articulated system much safer than if external flexible hoses susceptible to damage were employed.

Figure 10:
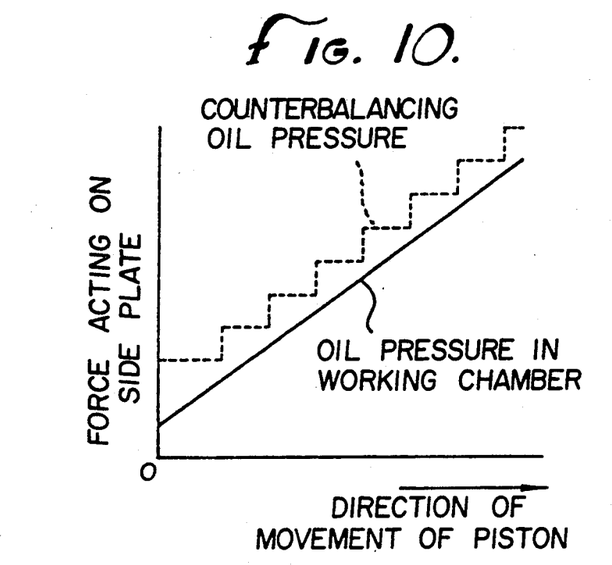
FIG. 10 is a graph showing a pressure counterbalancing effect according to the present invention.

FIG. 10 is a graph showing a pressure counterbalancing effect of the motor 8. The solid-line curve in FIG. 10, represents the oil pressure in the working chamber for pushinq the side plate 60 axially outwardly, and the broken-line curve indicates the counterbalancing oil pressure acting on the side plate 60, which progressively increases as the stroke of the piston 36 increases. If the counterbalancing oil pressure is higher than the oil pressure in the working chamber at all times, then the side plate 60 is pressed against the end of the cylinder 45 at all times under the pressure difference. According to the present invention, the counterbalancing pressure is not fixed but is variable, i.e., rises with the stroke of the piston 36 so as to be slightly higher than the oil pressure developing in the working chamber and acting on the side plate 60. Therefore, any forces applied to the side plate 60 and tending to deform the same are very low, and hence the side plate 60 may be made of a lightweight material such as aluminum having a low Young's modulus. The forces applied from the working chamber to push the side plate 60 outwardly and the counterbalancing forces applied to the side plate 60 to push the same inwardly have substantially aligned centers, so that moments acting on the side plate 60 are kept in equilibrium to prevent the side plate 60 from being unduly tilted or deformed. When the piston stroke is 0 in FIG. 10, the magnitude of the counterbalancing pressure depends upon the area of the central pressure chamber 63. The magnitudes of the stepped values of the counterbalancing pressure in FIG. 10 depend upon the designed areas of the respective counterbalancing pressure chambers 64 through 71.

With the plural vanes 40 provided for an increased sealing effect, a certain pressure P lower than the pressure in the working chamber is present between the vanes 40, and counterbalancing pressure chambers are also present behind the side plate 60 in axial alignment with the spaces between the vanes 40. Since the pressure P is introduced into such counterbalancing pressure chambers through the holes 73, these pressures on the opposite sides of the side plate 60 are also counterbalanced. In the above embodiment, the central pressure chamber 63 is supplied with the oil pressure from the oil pressure source 5, but not with the oil pressure from the working chamber, i.e., the output oil pressure from the directional control valve 80. However, oil pressure in the working chamber may be supplied to the central pressure chamber 63. No pressure has been described as being introduced into the non-sealing chamber 72 because the stator 48 is disposed on the side of the side plate 60 which is opposite to the chamber 72 for mechanically backing up the side plate 60 no matter how high the oil pressure in the chamber 72 may be. Therefore, the oil pressure from the oil pressure source 5, or the oil pressure from the working chamber, or the oil pressure from the tank 6 may be introduced into the chamber 72. In this embodiment, leaking oil pressure acts in the chamber 72.

Figure 11:
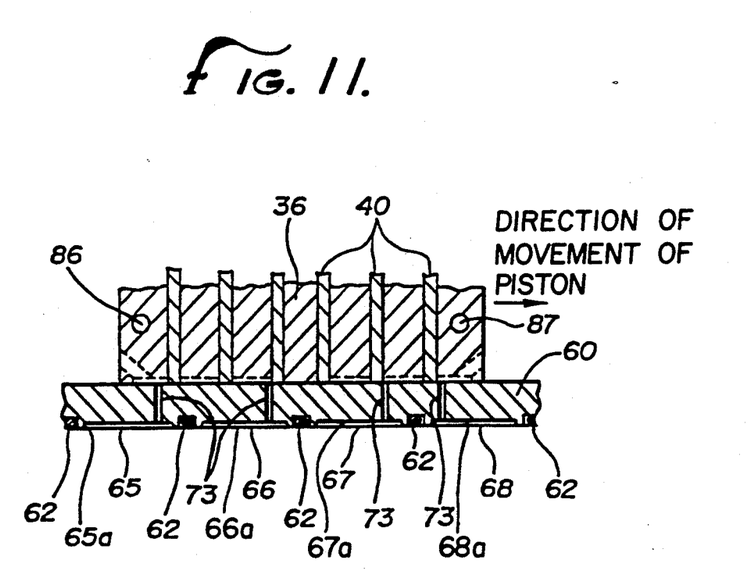
FIG. 11 is a cross-sectional view taken along line XI—XI of FIG. 7.

For a better understanding the counterbalancing of the pressures in the motor 8, FIG. 11 shows the relationship between the counterbalancing pressure chambers and the vanes 40 when the vanes 40 move past the small holes 73. A study of FIG. 11 indicates that the vanes 40 may not necessarily be required but the piston 36 itself may be used to open and close the holes 73. Use of the vanes 40 is however advantageous in that they provide a more reliable seal between the two working chambers 42, 44 and produce stepwise counterbalancing oil pressures introduced into the respective counter-balancing pressure chambers for generating more accurate counterbalancing forces.

As described above, the oil under pressure is supplied from the oil pressure source 5 through the oil passage 86 or 87 and its opening 86a or 87a into the cylinder 45. Air mixed in the oil supplied to one of the working chambers 42, 44 is separated from the oil due to the difference between their specific gravities and stays in an upper portion of the working chamber. Since the openings 86a, 87a of the oil passages 86, 87 are positioned in the highest locations in the cylinder 45, the oil can efficiently be discharged when it is returned from the motor 8 to the tank 6. When returning the oil to the tank 6, the air is less liable to remain trapped in the working chambers because the openings 86a, 87a are disposed near the vanes 40 which force the oil and air to flow therethrough out of the working chambers.

The working fluid in the above embodiment has been described as being oil, but may be air. Where air is employed as the working fluid, those pipes required to return oil back to the tank are not necessary. The pipes 90, 91 are attached to the casing 11 through the 0-rings 92 and hence can be detached therefrom. However, the pipes 90, 91 may be directly fixed to the casing and the yoke by brazing. The angular displacement motor 8 is not limited to the illustrated design, but may be an axial piston motor, for example. While the illustrated angular displacement motor 8 is associated with a pressure counterbalancing mechanism, the principles of the present invention are also applicable to an angular displacement motor which is not combined with a pressure counterbalancing mechanism.

Although a certain preferred embodiment has been shown and described, it should be understood that many changes and modifications may be made therein without departing from the scope of the appended claims.

What is claimed is:

1. An articulated mechanism comprising:
   a plurality of articulations;
   a plurality of arms interconnecting said articulations;
   a plurality of fluid pressure motors disposed in said articulations, respectively, for displacing said arms relatively to each other, each of said fluid pressure motors comprising an angular displacement motor for angularly displacing the arms relatively to each other, said angular displacement motor comprising a cylinder, a piston angularly movably disposed in said cylinder, and a fluid pressure directional control valve disposed in said piston axially centrally with respect to said cylinder, said piston having oil passages extending radially between an outer circumferential surface thereof and said fluid pressure directional control valve for supplying the fluid to a working chamber defined in said cylinder on one side of said piston and for discharging the fluid from another working chamber defined in said cylinder on the other side of said piston, wherein said piston has a plurality of sealing vanes disposed therein and slidably held against an inner circumferential surface of said piston, and means for applying a fluid pressure to said vanes to urge the vanes radially outwardly against said piston;
   a plurality of pipes positioned within said arms, respectively, for supplying a fluid under pressure to said articulations; and
   a plurality of oil passages disposed in said articulations, respectively, and branches from said pipes, respectively, to supply the fluid under pressure to said fluid pressure motors.

2. An articulated mechanism comprising:
   a plurality of articulations;
   a plurality or arms interconnecting said articulations;
   a plurality of fluid pressure motors disposed in said articulations, respectively, for displacing said arms relatively to each other, each of said fluid pressure motors comprising an angular displacement motor for angularly displacing the arms relatively to each other, said angular displacement motor comprising a cylinder, a piston angularly movably disposed in said cylinder, and a fluid pressure directional control valve disposed in said piston axially centrally with respect to said cylinder, said piston having oil passages extending radially between an outer circumferential surface thereof and said fluid pressure directional control valve for supplying the fluid to a working chamber defined in said cylinder on one side of said piston and for discharging the fluid from another working chamber defined in said cylinder on the other side of said piston, said angular displacement motor further including a side plate held sideways against said cylinder and piston, said working chambers being defined jointly by said side plate, said cylinder, and said piston, said side plate having a plurality of pressure chambers defined in a side thereof which is opposite to said working chambers, and means for introducing a fluid pressure from said working chambers successively into said pressure chambers in response to angular movement of said piston in said cylinder;
   a plurality of pipes positioned within said arms, respectively, for supplying a fluid under pressure to said articulations; and
   a plurality of oil passages disposed in said articulations, respectively, and branched from said pipes, respectively, to supply the fluid under pressure to said fluid pressure motors.

3. An articulated mechanism according to claim 2, wherein said pressure chambers comprise a plurality of recesses defined in said side of the side plate, said introducing means comprising holes defined in said side plate and providing fluid communication between said working chambers and said recesses, said holes being successively openable and closable in response to the angular movement of said piston in said cylinder.

4. An articulated mechanism according to claim 3, wherein said holes are successively openable and closable by said piston.

5. An articulated, mechanism according to claim 3, wherein said piston has a plurality of sealing vanes disposed therein and slidably held against an inner circumferential surface of said piston, said holes being successively openable and closable by said vanes.

6. An articulated mechanism according to claim 3, wherein said holes are defined at upper positions in said recesses, respectively.

7. An articulated mechanism according to any of claims 5 through 6, wherein said side plate further includes sealing means disposed around said recesses.

8. An articulated mechanism comprising:
   a plurality of articulations;
   a plurality of arms interconnecting said articulations;
   a plurality of fluid pressure motors disposed in said articulations, respectively, for displacing said arms relatively to each other;
   a plurality of pipes positioned within said arms, respectively, for supplying a fluid under pressure to said articulations; and
   a plurality of fluid passages disposed in one of said articulations and branched from one of said pipes to supply the fluid under pressure to said fluid pressure motors,
   wherein each of said fluid pressure motors comprises an angular displacement motor for angularly displacing the arms relatively to each other, said angular displacement motor comprising a cylinder, a piston angularly movably disposed in said cylinder, and a fluid pressure directional control valve disposed in said piston axially centrally with respect to said cylinder, said piston having fluid passages extending radially between an outer circumferential surface thereof and said fluid pressure directional control valve for supplying the fluid to a working chamber defined in said cylinder on one side of said piston and for discharging the fluid from another working chamber defined in said cylinder on the other side of said piston.

9. An articulated mechanism according to claim 8, further comprising a control direct current motor for applying a controlling angular displacement to said fluid pressure directional control valve.

10. An articulated mechanism comprising:
    a plurality of articulations;
    a plurality of arms interconnecting said articulations;
    a plurality of fluid pressure motors disposed in said articulations, respectively, for displacing said arms relatively to each other;

a plurality of pipes positioned within said arms, respectively, for supplying a fluid under a pressure to said articulations;

a plurality of fluid passages disposed in said articulations and branched from one of said pipes to supply the fluid under pressure to said fluid pressure motors, wherein each of said fluid pressure motors comprises an angular displacement motor for angularly displacing the arms relatively to each other, said angular displacement motor comprising a cylinder, a piston angularly movably disposed in said cylinder, and a fluid pressure directional control valve disposed in said piston axially centrally with respect to said cylinder, said piston having fluid passages extending radially between an outer circumferential surface thereof and said fluid pressure directional control valve for supplying the fluid to a working chamber defined in said cylinder on one side of said piston and for discharging the fluid from another working chamber defined in said cylinder on the other side of said piston.

11. An articulated mechanism comprising:
a plurality of articulations;
a plurality of arms interconnecting said articulations;
a plurality of fluid pressure motors disposed in said articulations, respectively, for displacing said arms relatively to each other;
a plurality of pipes positioned within said arms, respectively, for supplying a fluid under a pressure to said articulations;
a plurality of fluid passages disposed in one of said articulations and branched from one of said pipes to divide the fluid under said pressure into a first flow of fluid under said pressure supplied to one of said fluid pressure motors and a second flow of fluid under said pressure directed toward another articulation, wherein each of said fluid pressure motors comprises an angular displacement motor for angularly displacing the arms relatively to each other, said angular displacement motor comprising a cylinder, a piston angularly movably disposed in said cylinder, and a fluid pressure directional control valve disposed in said piston axially centrally with respect to said cylinder, said piston having fluid passages extending radially between an outer circumferential surface thereof and said fluid pressure directional control valve for supplying the fluid to a working chamber defined in said cylinder on one side of said piston and for discharging the fluid from another working chamber defined in said cylinder on the other side of said piston.

* * * * *